United States Patent

Suzuki et al.

[11] Patent Number: 5,815,548
[45] Date of Patent: Sep. 29, 1998

[54] PHOTOGRAPHING DEVICE AND X-RAY PHOTOGRAPHING SYSTEM UTILIZING THE SAME

[75] Inventors: Kenichi Suzuki, Yokohama; Akira Tago, Kawasaki; Haruhisa Madate, Yokohama; Masaaki Kobayashi, Kawasaki, all of Japan

[73] Assignee: Canon Kabushiki Kaisha

[21] Appl. No.: 252,536

[22] Filed: Jun. 1, 1994

Related U.S. Application Data

[63] Continuation of Ser. No. 13,219, Feb. 1, 1993, abandoned, which is a continuation of Ser. No. 663,420, Mar. 1, 1991, abandoned.

[30] Foreign Application Priority Data

Mar. 2, 1990 [JP] Japan .................................. 2-050855
Jan. 16, 1991 [JP] Japan .................................. 3-003254

[51] Int. Cl.⁶ ........................................................ G03B 42/02
[52] U.S. Cl. ............................................. 378/173; 378/174
[58] Field of Search ....................................... 378/173, 174

[56] References Cited

U.S. PATENT DOCUMENTS 3,891,850  6/1975  Bridgeman ............................. 378/173
4,734,925  3/1988  Muller et al. ........................... 378/173

FOREIGN PATENT DOCUMENTS

53-16291  4/1978  Japan .
60-4178   2/1985  Japan .

*Primary Examiner*—Craig E. Church
*Attorney, Agent, or Firm*—Fitzpatrick, Cella, Harper & Scinto

[57] ABSTRACT

A photographing device is provided with a pair of support members positioned in mutually opposed manner across a film, a sensitivity increasing screen mounted on at least one of the paired support members, a sealing member for hermetically sealing a space containing the film and the sensitivity increasing screen, a vacuum pump for reducing the pressure in the sealed space to maintain the film and the sensitivity increasing screen in mutual close contact, and a support member for maintaining the film in a predetermined position between the support member in the sealed space. Thus the sensitizing screen can be securely contacted with the film, and errors in operation are reduced even when the photographing operation is conducted with the film in vertical or inclined position.

11 Claims, 6 Drawing Sheets

PHOTOGRAPHING DEVICE AND X-RAY PHOTOGRAPHING SYSTEM UTILIZING THE SAME

This application is a continuation of application Ser. No. 07/013,219 filed Feb. 1, 1993, now abandoned which is a continuation of Ser. No. 07/663,420, filed Mar. 1, 1991, abandoned.

BACKGROUND OF THE INVENTION

1. Field of the Invention

The present invention relates to a device composed of a pair of support members, on at least one of which a sensitizing screen is mounted, said support members being positioned opposed to a photographing stage and supporting therebetween a photographing film, for X-ray photographing thereon.

2. Related Background Art

In an X-ray photographing apparatus for X-ray photographing for example the chest of a patient, in order to support an X-ray film in a photographing stage, there has conventionally been proposed a mechanism for maintaining the X-ray film in close contact with a sensitizing screen by mechanically pressing a rear support member toward a front support member with satisfactory transmittance to the X-ray. In such method, however, satisfactory contact is difficult to attain because of the deformation of the support members by the pressing force, so that it is necessary to provide particular structure in the support members, and to regulate the pressing force in different portions of the entire plane. Also the front support member has to have a high regidity and a satisfactory transmittance to the X-ray, and has therefore to be made with an expensive material difficult to work, such as CFRP plate.

Because of these drawbacks there is also known so-called vacuum contact method in which the front or rear sensitizing screen is mounted on an elastic member such as rubber which is in turn mounted on a frame-shaped rigid support member, and the space surrounded by the front and rear sensitizing screens is sealed by suitable means such as a packing and is reduced in pressure by a vacuum pump connected thereto, whereby the elastic support member is pressed by the atmospheric pressure toward the other support member, thus achieving close contact. Such a method is for example disclosed in the Japanese Utility Model Publication No. 53-16291.

As the film is placed horizontally in such a device, it is not displaced from the predetermined position within a period from the film feeding with rollers to said position to the replacement of a cover. However, if this vacuum contact method is employed in a photographing apparatus in which the film is vertically supported, the film will drop by gravity in a period from the separation of rollers to the replacement of the cover and the pressure reduction of the interior.

Also in such a vacuum contact method, in case of photographing with the film in a nonhorizontal position, a notch is required as disclosed in the Japanese Utility Model Publication No. 60-4178 for loading, unloading and supporting the film, but the presence of such a notch enhances the air leakage, thus requiring a larger capacity in the vacuum means such as a vacuum pump.

SUMMARY OF THE INVENTION

The object of the present invention is to provide an X-ray photographing device capable of achieving vacuum sealing over the entire area, also ensuring secure contact of the sensitizing screen to the film even with vacuum means such as a vacuum pump of a limited capacity, and providing few errors in the photographing operation with the film in vertical or inclined position, and a photographing system employing said X-ray photographing device.

DESCRIPTION OF THE PREFERRED EMBODIMENTS

In the following there will be explained in detail embodiments of an apparatus for X-ray photographing of the chest of a person, with reference to the attached drawings.

Figure 12:
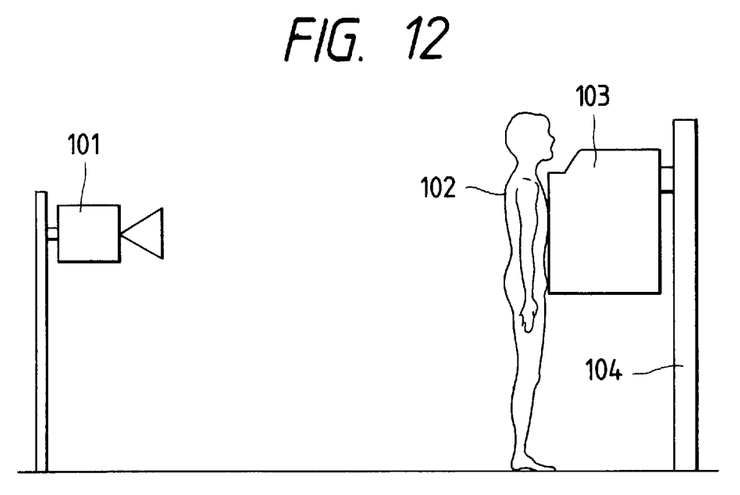
FIG. 12 is a schematic view of a photographing system utilizing the X-ray photographing device.
Figure 13:
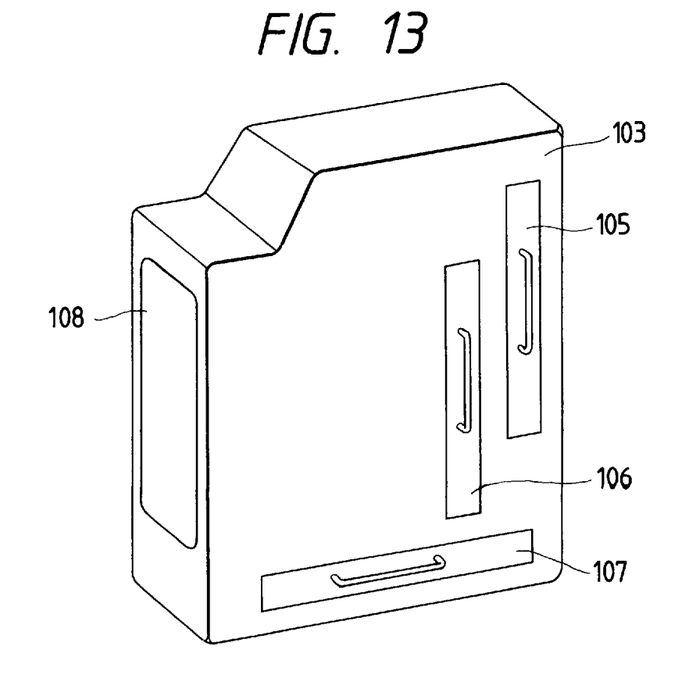
FIG. 13 is an external view of the X-ray photographing device.

FIG. 12 schematically shows an X-ray photographing system, for X-ray photographing of the chest of a person to be inspected, wherein shown are an X-ray tube 101; a person 102 to be inspected; an X-ray photographing device 103; and a support 104 therefor. FIG. 13 is an external view of the X-ray photographing device 103 shown in FIG. 12, wherein 105 and 106 are supply magazines containing unexposed X-ray films of different sizes, and 107 indicates a receiving magazine containing an exposed film. 108 is a chest plate to which the chest of the person to be inspected is to be maintained in contact. Inside said chest plate there is provided a photographing stage for setting a film, and the X-ray irradiation is made while an X-ray film is supported on said stage whereby the X-ray image of the chest of said person is recorded on said film.

Figure 1:
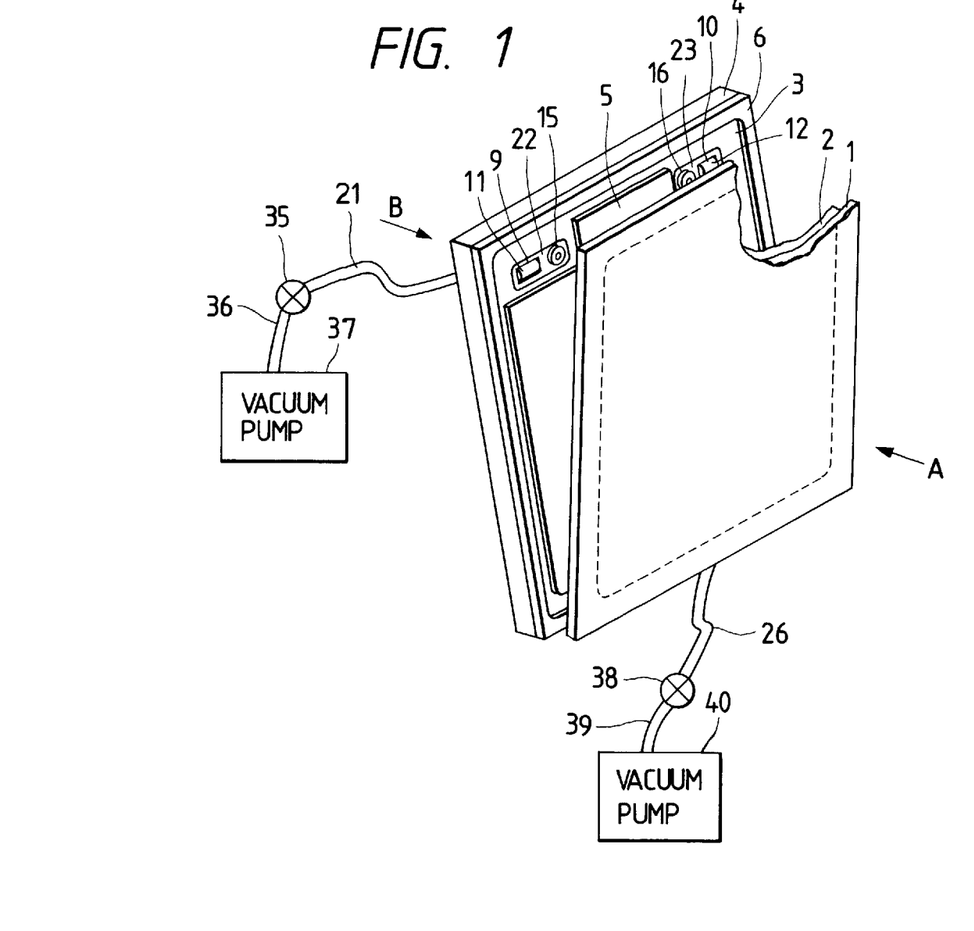
FIG. 1 is a perspective view of an embodiment of the present invention.
Figure 2:
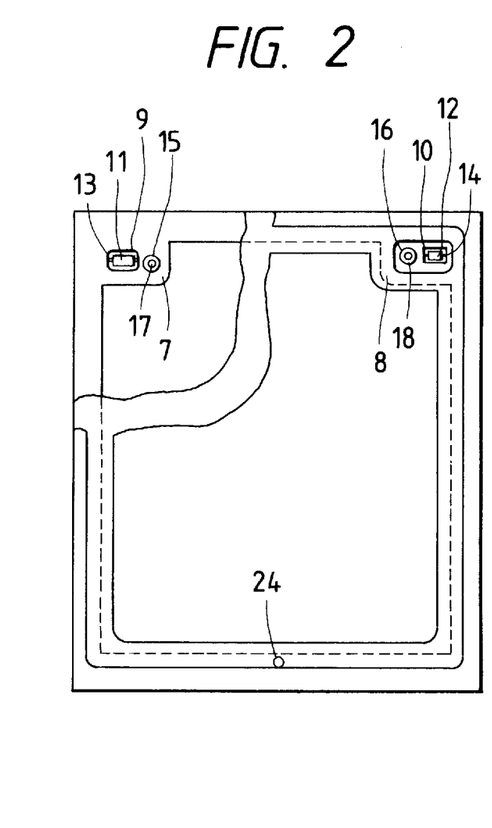
FIG. 2 is a front view of said embodiment seen from a direction A shown in FIG. 1.
Figure 3:
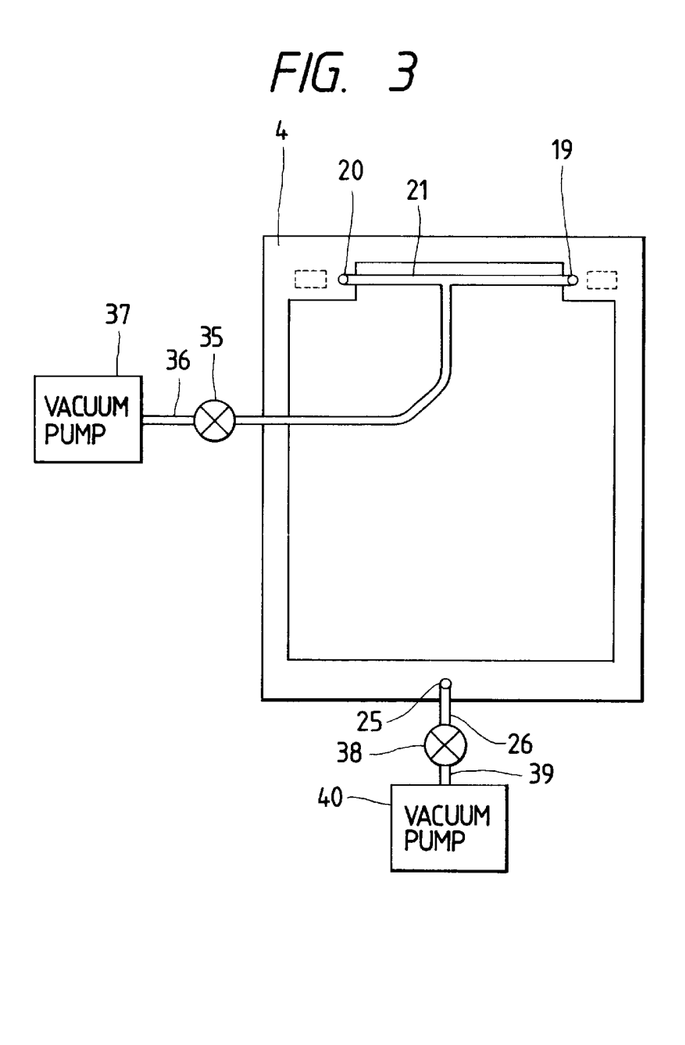
FIG. 3 is a rear view of said embodiment seen from a direction B shown in FIG. 1.
Figure 4:
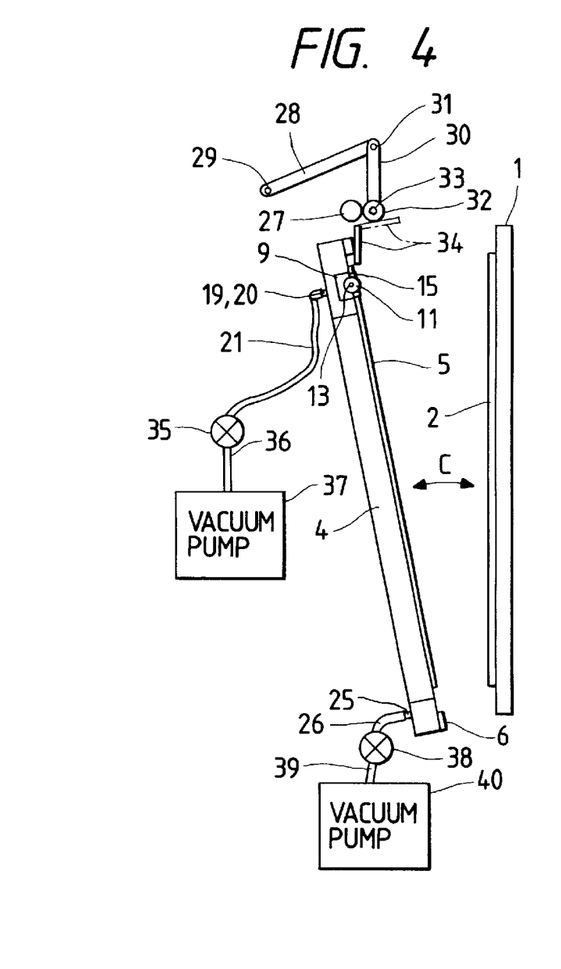
FIG. 4 is a lateral view of said embodiment.
Figure 5:
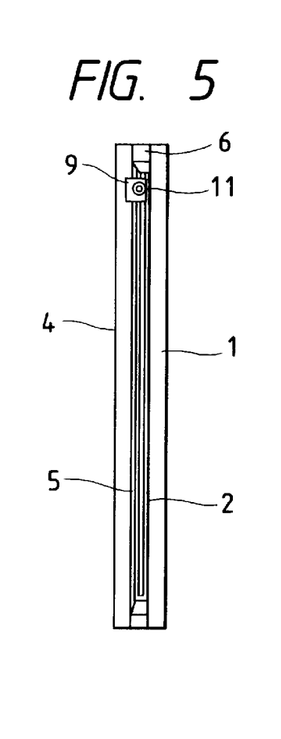
FIG. 5 is another lateral view of said embodiment.

The internal structure of the X-ray photographing device shown in FIG. 13 will be explained in more details, with reference to other drawings. FIG. 1 is a perspective view of the structure principally of said stage; FIG. 2 is a front view of said interior seen from a direction A shown in FIG. 1; FIG. 3 is a rear view of said interior seen from a direction B shown in FIG. 1; FIGS. 4 and 5 are lateral views; and FIGS. 6 to 9 are views showing the function.

A front support member 1 is made of a material of a satisfactory X-ray transmittance, and a front sensitizing screen 2 is adhered thereto. A rear support member 3 is made of an elastic and extendable material such as rubber, and is mounted for example by adhesion on a frame member 4 of higher rigidity. A rear sensitizing screen 5 is mounted for example by adhesion on the rear support member 3. The sensitizing screens need not necessarily be present front and rear, but the photographing is possible if at least a screen is provided on either side. A hermetic flexible packing 6 is mounted, for example by adhesion, on the frame member 4, either directly or by way of the rear support member 3. The rear sensitizing screen 5 is rendered movable front and back to a certain extent, by the elasticity of the rear support member 3. At left and right in the internal upper part of the frame member 4, there are provided protruding portions 7, 8 as shown in FIG. 2. In said protruding portions 7, 8 there are respectively provided recesses 9, 10, in which rollers 11, 12 are respectively supported rotatably on horizontal shafts 13, 14. As shown in FIG. 4, these rollers 11, 12 slightly protrude from the front face of the frame member 4. Also on the protruding portions 7, 8 there are mounted, for example by adhesion, annular suction members 15, 16 made of a flexible material such as rubber. These suction members 15, 16 have a height, when seen from the side, slightly lower than the protruding height of the rollers 11, 12, and serve to support the film by suction. These suction members 15, 16 and the rollers 11, 12 are so positioned as to be inside two apertures 22, 23 provided on the rear support member 3.

As shown in FIG. 2, the suction members 15, 16 have, at the centers thereof, exhaust holes 17, 18 which also penetrate the protruding portions 7, 8. As shown in FIG. 3, the frame member 4 is provided, on the rear side thereof, with projections 19, 20 having holes communicating with the exhaust holes 17, 18, and a branched air hose 21 is connected to said projections 19, 20. At the other end of the air hose 21 there are connected a control valve 35, and, through an air hose 36, a vacuum pump 37. The film is supported by suction, by reducing pressure inside said suction members 15, 16.

On the other hand, in the lower part of the frame member 4, there are provided an exhaust hole 24 penetrating through the rear support member 3 and the frame member 4, and a projection 25 having a hole communicating with said exhaust hole 24. On said projection 25 mounted is an air hose 26, of which the other end is connected to a control valve 38 and, through an air hose 39, a vacuum pump 40 which serves to reduce the pressure in a sealed space including the X-ray film and the sensitizing screens.

In the following the pressure reducing means including the vacuum pump 40 and the control valve 38 will be called the first vacuum means, and that including the vacuum pump 37 and the control valve 35 will be called the second vacuum means. The level of vacuum of the support means created by the second vacuum means is selected stronger than that in the sealed space created by the first vacuum means.

Referring to FIG. 4, the front support member 1 is fixed on an unrepresented frame, while the frame member 4 is rotatably supported by said frame and can rotate in a direction C in FIG. 4 by unrepresented drive means thereby contacting or separating the front and rear support members. Above the front support member 1, a roller 27 is rotatably supported by said frame. A lever 28 is rotatably supported by a fixed shaft 29, then a lever 30 is articulated to said lever 28 by way of a shaft 31, and a roller 32 is rotatably supported by a shaft 33 mounted on the end of the lever 30. Rotation of the lever 28 about the fixed shaft 29 allows the roller 32 to move between positions shown in FIGS. 6 and 7, by means of unrepresented guide means. The roller 32 is constantly biased in a direction D shown in FIG. 6 or 7, by unrepresented biasing means, either in the position in FIG. 6 or 7 or during the movement, and is rotated in the state shown in FIG. 6 or 7 or during the movement. Said levers 28, 30 and rollers 27, 32 are provided on each lateral side of the film, but the rollers 27, 32 may be extended over the entire width of the film. Below the roller 32 there is provided, as shown in FIG. 4, a movable guide plate 34, which can be moved between solid-lined and broken-lined positions.

Figure 6:
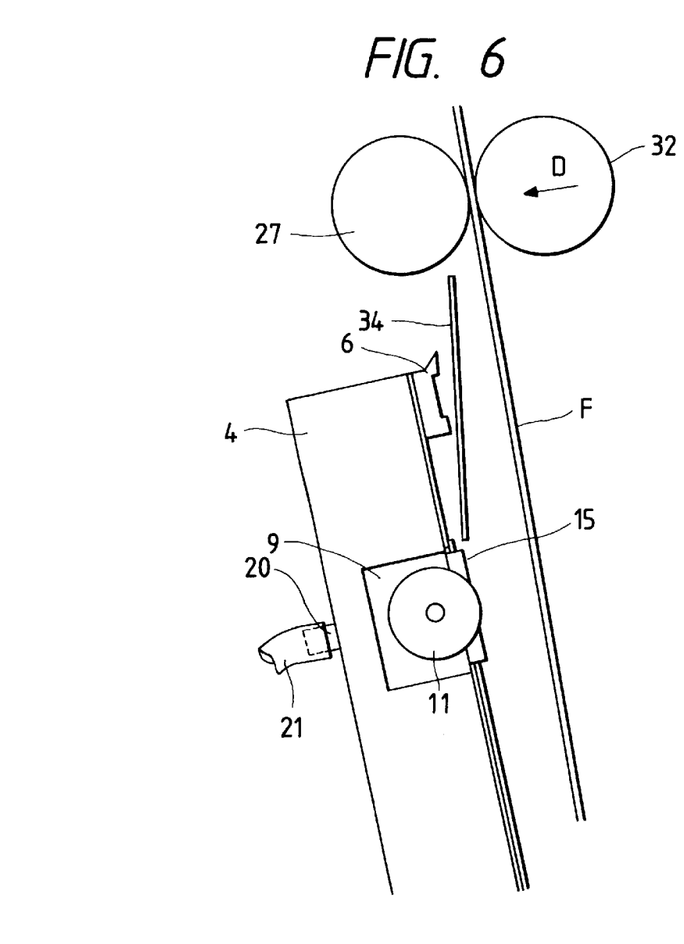
FIGS. 6 to 9 are views showing the function of said embodiment.
Figure 7:
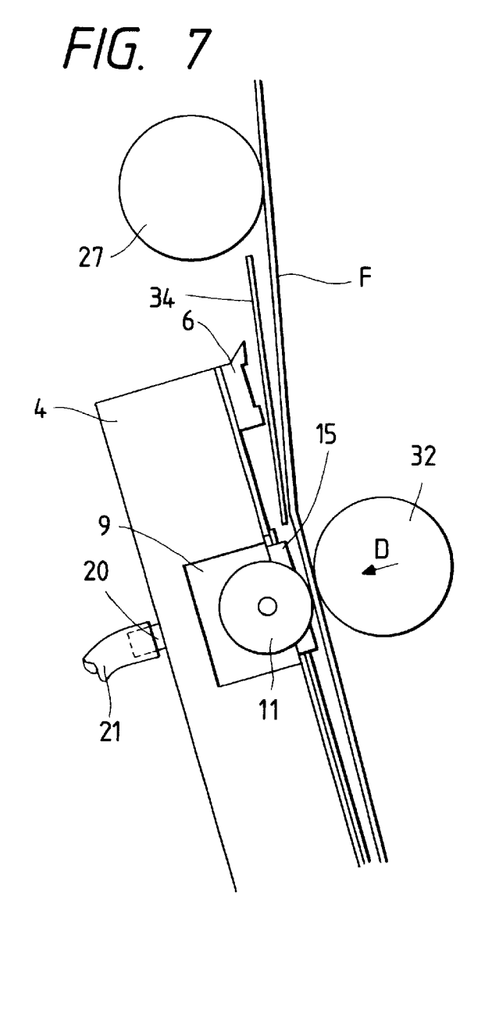

In the following there will be explained the function of the above-explained structure. A film is taken out by an unrepresented feeding mechanism from stacked plural films in the supply magazine. The film F thus taken out is pinched between the rollers 27, 32 and fed from above as shown in FIGS. 4 and 6, and inserted between the sensitizing screens 2 and 5. Immediatedly before the rear end of the film F leaves the rollers 27, 32, the roller 32 is stopped, the lever 28 is rotated clockwise, and the roller 32 is rotated again in such a manner that the peripheral speed thereof becomes equal to the moving speed thereof, whereby the roller rolls on the film substantially without slippage. When the roller 32 reaches the position shown in FIG. 7, it is rotated counterclockwise and it is stopped at a position where the upper ends of the film F and the sensitizing screens substantially meet.

Then the film F is sucked by the second vacuum means. More specifically, the vacuum pump 37 is activated to generate, in the exhaust holes 17, 18, a reduced pressure determined by the control valve 35 through the air hoses 36, 21 whereby the film F is sucked to the suction members 15, 16. Then the lever 28 is rotated counterclockwise and the roller 32 is rotated counterclockwise in such a manner that the peripheral speed thereof is equal to the moving speed thereof, whereby said roller 32 is elevated by rolling on the film F and the guide plate 34 without slippage. Rotation of the lever 28 and the roller 32 is terminated when the roller 32 returns to the initial position.

Figure 8:
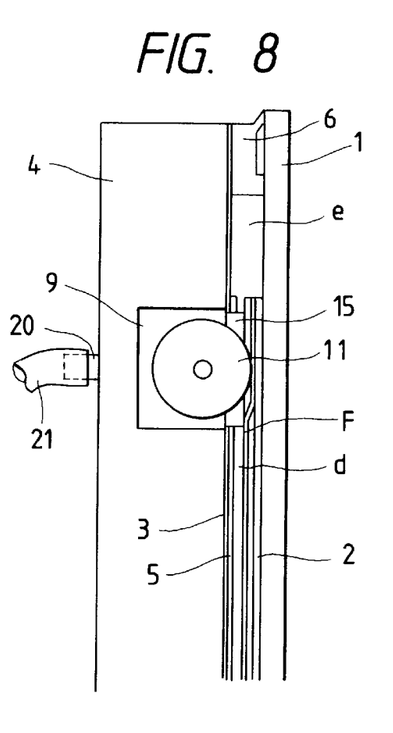

When the guide plate 34 is elevated to the broken-lined position in FIG. 4, and the frame member 4 is advanced by rotation whereby the front support member 1 and the frame member 4 are mutually closed as shown in FIGS. 5 and 8. During these operations, the film F is supported by suction by the suction members 15, 16. In the closed state shown in FIGS. 5 and 8, the rear and front sensitizing screens 5 and 2 are not mutually contacted but have a small gap d therebetween, but a space (hereinafter called space $\alpha$) surrounded and sealed by the front support member 1, rear support member 3, frame member 4 and packing 6 is in a hermetically sealed state.

Figure 9:
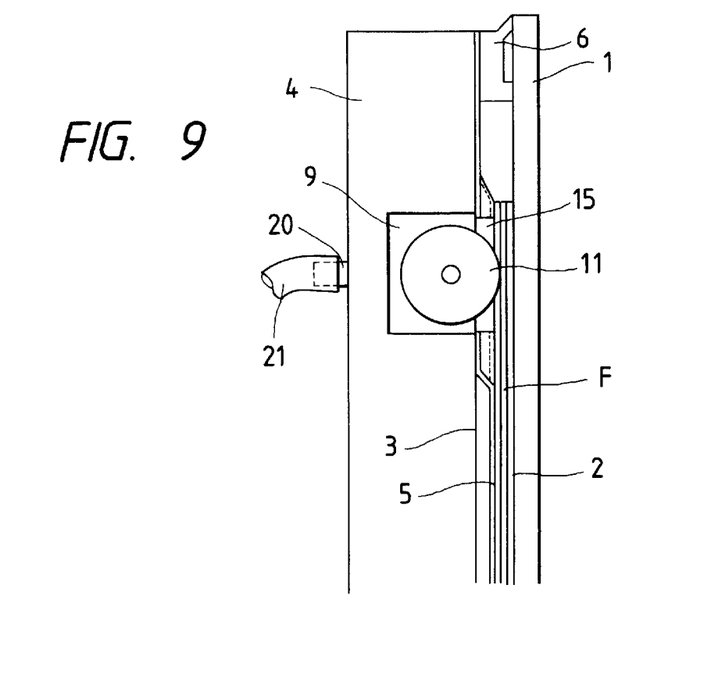

In this state, the pressure of said space a is reduced by the first vacuum means. More specifically, the vacuum pump 40 is activated to suck the internal air through the air hoses 39, 26 and the exhaust hole 24, thereby bringing the space a to a reduced pressure determined by the control valve 38. Because of its elasticity, the rear support member 3 is movable front and back at the aperture of the frame member 4 and moves forward together with the rear sensitizing screen 5 by being pushed by the atmospheric pressure, whereby the film F is brought into close contact with the front and rear sensitizing screens 2, 5 as shown in FIG. 9. For example, if the internal pressure of the space $\alpha$ is made lower by 0.2 atm. than the atmospheric pressure, a pressing force of 0.2 kgf/cm$^2$ will be exerted.

If the reduced pressure of the space a created by the first vacuum means is made equal to the reduced pressure created by the second vacuum means for sucking the film F, the suction members 15, 16 will lose the power to support the film F as the pressure in the space $\alpha$ is reduced. If even a slight air layer is formed between the suction members 15, 16 and the film F, the film F may drop when the space $\alpha$ is opened to the atmospheric pressure after the X-ray photographing. In the present embodiment, therefore, the vacuum level of the second vacuum means is selected larger than that of the first vacuum means, whereby the film F is securely supported by the suction members 15, 16 even when the pressure of the space $\alpha$ is reduced.

After the film is set in the photographing stage as explained above, the X-ray photographing of the chest of the person to be inspected is conducted by the system shown in FIG. 12. After said photographing, the first vacuum means is deactivated and the space α is opened to the atmospheric pressure, whereby a gap is again formed between the front and rear sensitizing screens 2, 5 by the returning force of the rear support member 3. In this state the second vacuum means is still active. Then the frame member 4 moves backward with counterclockwise rotation to return the state shown in FIGS. 4 and 7. Subsequently the guide plate 34 moves to the solid-lined position in FIG. 4, and the roller 32 moves to the position in FIG. 7, by rolling without slippage as explained before. Then the second vacuum means is deactivated and the exhaust holes 17, 18 are opened to the atmospheric pressure, whereby the suction force is lost and the film F leaves from the suction members 15, 16. Thus, when the reduced pressure in the space α is released, the film F released from the sensitizing screens is prevented from dropping by the gravity, as it is still supported by the support means.

Then the roller 32 is rotated clockwise, and is stopped when the leading end of the film F reaches a position slightly above the roller 27. Subsequently the roller 32 is moved to a position in FIG. 6 by rolling without slippage as explained before, and the rotation of the lever 28 is terminated and the roller 32 is rotated clockwise to advance the film F from between the sensitizing screens 2, 5. Thus advanced exposed film F is accommodated in the receiving magazine by an unrepresented transport mechanism.

In the above-explained embodiment, the control valves 35, 38 are provided for obtaining different vacuum levels in the support members 15, 16 and in the space α, but said control valves may be dispensed with if the vacuum level created by the pump 37 is larger than that created by the pump 40. Also even in case the vacuum levels of said pumps 37, 40 are same, a similar effect can be obtained by dispensing with the control valve 35 for film supporting and controlling the vacuum level with the control valve 38. In any case the pressure for supporting the film F should be selected lower than that in the space α.

In the above-explained embodiment, the packing 5 is fixed on the frame member 4, but it may be fixed on the front support member 1. Also instead of driving the roller 32, it is possible to constructe the roller 32 as an idler roller and to drive the rollers 27, 11, 12. For driving the rollers 11, 12, a small motor may be provided in the frame member 4 so as not to deteriorate the hermeticity. Otherwise the frame member 4 may be provided with an open/closable cover, which is closed to maintain the hermeticity when the frame member 4 is closed, but is opened for inserting drive transmission means in case of driving said rollers 11, 12.

As explained in the foregoing, the present embodiment securely achieves close contact of sensitizing screens to the film even with a limited capacity in the vacuum means such as vacuum pump, since the sealing by the frame members is obtained over the entire area. Also a high reliability without errors in operation can be obtained as the sucking force to the film is made stronger than the vacuum in the sealed space.

Figure 10:
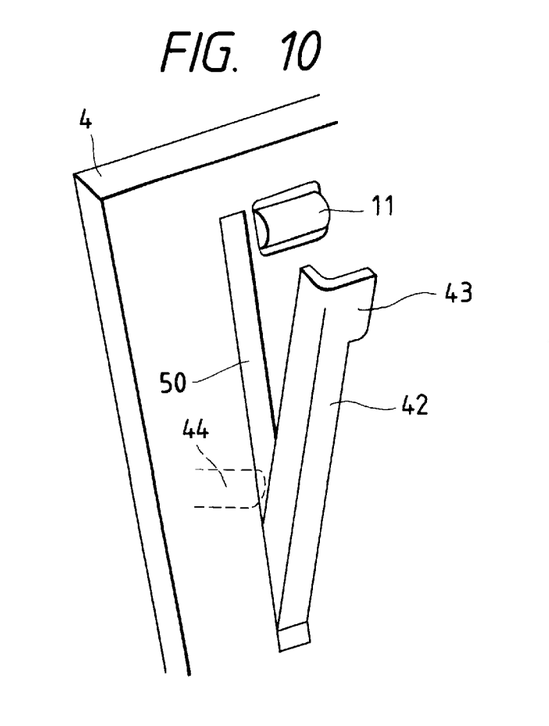
FIGS. 10 and 11 are schematic views showing a variation of support means.
Figure 11:
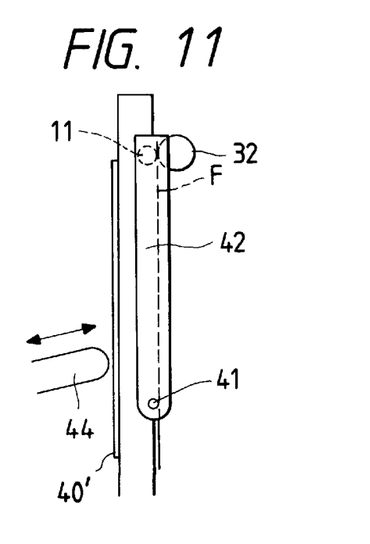

FIGS. 10 and 11 illustrate a variation of the support means for the film. This embodiment is featured by supporting the film with pressing levers in the sealed space, instead of suction support of the film with the suction members. The frame member 4 is provided with an oblong groove 50, accommodating a lever 42 rotatable about a shaft 41. At the end of said lever 42 there is provided a projecting part 43 for pressing and supporting an end portion of the film. The projecting part is configured so as not interfere with the roller 32 when the roller descends. The lever 42 is biased toward the frame member 4 by unrepresented biasing means. At the rear side of the groove 50 there is provided a thin stretchable rubber film 40' in order to prevent air leakage from the groove 50. Behind the frame member 4 there is provided a pushing member 44 which can be moved to or from the frame member 4 and is adapted, when moved thereto, to push up the lever 42 across said rubber film 40'. FIG. 10 shows a state where the lever 42 is pushed up. A similar structure is provided at the other side of the film, namely at the side of the roller 12, so that the film is supported in both end portions outside the image area.

In the above-explained structure, when the film F is brought into a predetermined position by a transport mechanism similar to that in the foregoing embodiment, the pushing member 44 is retracted, whereby the lever 42, which is initially pushed up as shown in FIG. 10, is biased to the frame member 4 as shown in FIG. 11, thereby supporting the film F by pressing an area outside the image area by means of the projecting portion of the lever 42. Then the roller 32 is elevated, and the frame member 4 is advanced to form a sealed space α. Subsequently the pressure in said space α is reduced by the vacuum means to maintain the film F in close contact between the sensitizing screens, and the photographing operation is conducted in this state. Subsequently the reduced pressure is released to cancel the close contact state, then the frame member 4 is retracted with descent of the roller 32, and the pushing member 44 is advanced to push up the lever 42. In this state the roller 32 is rotated clockwise to move the film F upwards, thereby transporting said film F from the photographing stage.

The present embodiment also has the advantages of secure close contact between the film and the sensitizing screens because of the sealing over the entire area by the frame members, and reduced errors in operations as the film is securely supported by the pressing levers.

In the foregoing embodiments, the film F is continuously supported by the support means from before the photographing operation to after said operation, for achieving securer and simpler operations, but such film supporting during the photographing operation is not indispensable, as long as the film is securely supported at least when the reduced pressure in the space α is released after said photographing operation.

What is claimed is:

1. A photographing device comprising:

a pair of support members positioned in mutually opposed manner across a film;

a sensitivity increasing member mounted on at least one of said paired support members;

seal means for hermetically sealing a space containing said film and said sensitivity increasing member;

vacuum means for reducing the pressure in said sealed space at a photographing operation, thereby maintaining said film and said sensitivity increasing member in mutual close contact; and holding means provided on at least one of said pair of support members for holding said film in a predetermined position between said support members in said sealed space, wherein said holding means comprises means for holding the film by suction, and wherein said holding means holds the film before the film is close to the sensitivity increasing member.

2. A device according to claim 1, further comprising:

means for introducing the film between said support members; and means for extracting the exposed film from between said support members.

3. A device according to claim 2, further comprising:

a supply magazine containing unused stacked films; and a receiving magazine for containing exposed films.

4. A device according to claim 1, wherein said holding means is provided on at least one of said support members.

5. A device according to claim 1 wherein said holding means comprises means for holding the film in one of a vertical position and an inclined position at the photographing operation.

6. A device according to claim 1, wherein said sensitivity increasing member is a sensitizing screen.

7. A photographing device comprising:

a pair of support members positioned in mutually opposed manner across a film;

a sensitivity increasing member mounted on at least one of said paired support members;

seal means for hermetically sealing a space containing said film and said sensitivity increasing member;

first vacuum means for reducing the pressure in said sealed space at a photographing operation, thereby maintaining said film and said sensitivity increasing member in mutual close contact;

support means provided on at least one of said pair of support members for sucking said film thereby supporting said film in a predetermined position between said support members in said sealed space; and second vacuum means for reducing the pressure in said support means thereby sucking said film at least before said first vacuum means reduces the pressure in said sealed space, wherein said support means supports the film accommodated in whole in the space sealed by said seal means.

8. A device according to claim 7, wherein said supporting means comprises means for supporting the film in one of a vertical position and an inclined position at the photographing operation.

9. A device according to claim 7, wherein said support means provided on the support member of a movable one of said support members.

10. A photographing device comprising:

a pair of support members positioned in mutually opposed manner across a film;

a sensitivity increasing member mounted on at least one of said paired support members;

seal means for hermetically sealing a space containing said film and said sensitivity increasing member;

first vacuum means for reducing the pressure in said sealed space at a photographing operation, thereby maintaining said film and said sensitivity increasing member in mutual close contact;

support means provided on at least one of said pair of support members for sucking said film thereby supporting said film in a predetermined position between said support members in said sealed space; and second vacuum means for reducing the pressure in said support means thereby sucking said film, wherein the pressure reduction created by said second vacuum means in said support means is selected larger than that created by said first vacuum means in said space.

11. A device according to claim 10, wherein said second vacuum means is so operated that said support means supports the film at least at the pressure reduction by said first vacuum means and at the release of the reduced pressure.

* * * * *

UNITED STATES PATENT AND TRADEMARK OFFICE
CERTIFICATE OF CORRECTION

PATENT NO. : 5,815,548
DATED : September 29, 1998
INVENTOR(S) : KENICHI SUZUKI, ET AL.

It is certified that error appears in the above-identified patent and that said Letters Patent is hereby corrected as shown below:

<u>COLUMN 4</u>

Line 55, "a" should read --$\alpha$--.

<u>COLUMN 8</u>

Line 8, "provided" should read --is provided--.

Signed and Sealed this

Seventh Day of September, 1999

Attest:

Q. TODD DICKINSON

*Attesting Officer*   *Acting Commissioner of Patents and Trademarks*